Dec. 20, 1938.   L. E. LA BRIE   2,140,752
BRAKE
Original Filed April 23, 1931
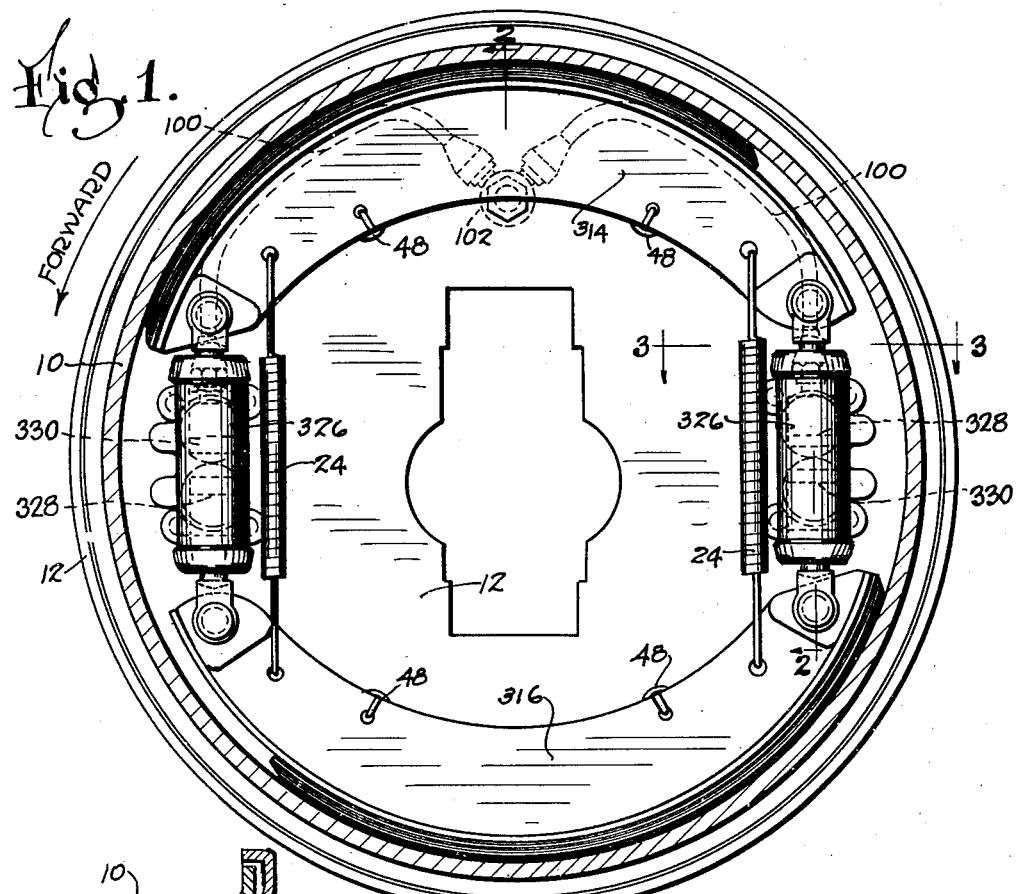
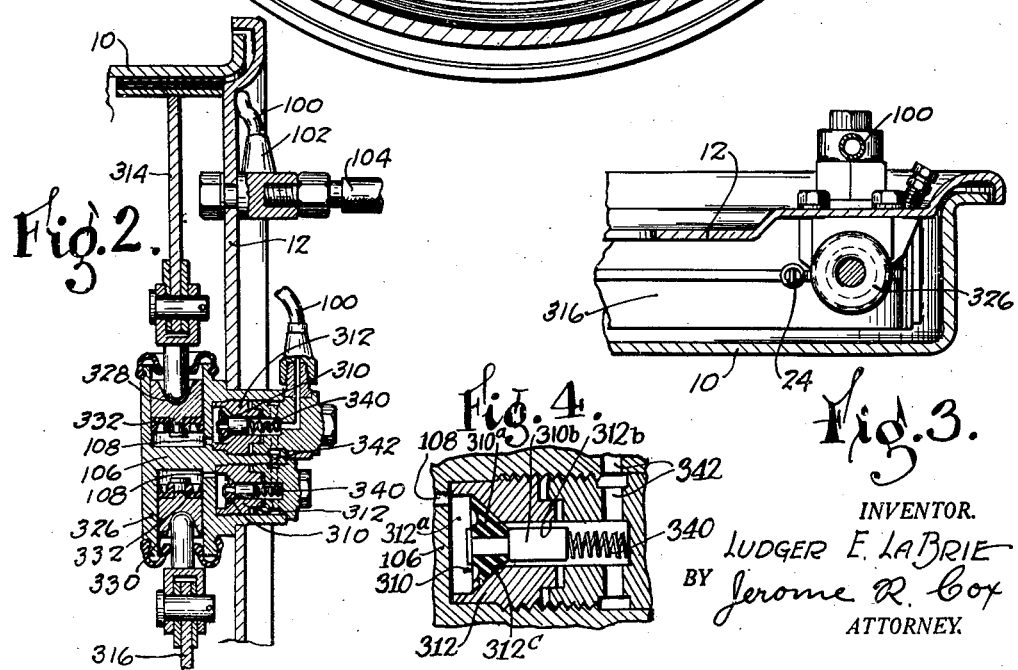
INVENTOR.
LUDGER E. LA BRIE
BY Jerome R. Cox
ATTORNEY.

Patented Dec. 20, 1938

2,140,752

UNITED STATES PATENT OFFICE 2,140,752

BRAKE

Ludger E. La Brie, South Bend, Ind., assignor to Bendix Brake Company, South Bend, Ind., a corporation of Illinois Original application April 23, 1931, Serial No. 532,265. Divided and this application May 31, 1935, Serial No. 24,388

13 Claims. (Cl. 188—152)

This application is a division of my copending application Serial No. 532,265, filed April 23, 1931. The invention relates to brakes and is illustrated as embodied in a novel type of shiftable-anchorage automobile brake.

One feature of the invention relates to arranging for fluid-pressure application a brake of the type having a pair of floating or individually-shiftable shoes, i. e., arranged to shift individually from one anchor to another so that both shoes have self-energizing characteristics in both directions of drum rotation. Preferably there are two fluid-pressure operators adjacent the opposite ends of the shoes, and these operators in the form illustrated in themselves embody a number of important features of novelty.

One important object relates to simplifying the wear adjustment of a brake of this type, by utilizing the brake applying cylinders as adjustable (i. e., expansible) anchors instead of attempting to adjust the shoes. This is especially desirable in combination with a fluid-pressure system of the well-known type, now practically universal commercially, in which a light pressure is maintained in the system even when the brakes are released, as the operating pistons under the influence of this light pressure follow the shoes out automatically as the anchors are adjusted. As this type of system always includes, in the master cylinder at the pedal, means for automatically keeping the system full of liquid, the adjusted released positions of the pistons are automatically compensated for in the master cylinder, and the automatic adjustments of the pistons are, therefore, the only adjustments in the entire system, this not being true of any of the previously-known arrangements of wear adjustments for brakes of this type.

An important feature of the invention relates to a simple and effective automatic adjustment for wear capable of embodiment in the wheel cylinders, and to various novel and desirable particular constructions and arrangements which will be apparent from the following description of the illustrative embodiments shown in the accompanying drawing, in which:

Figure 1 is a vertical section through a hydraulic brake of the type described above, just inside the head of the brake drum, showing the brake shoes in side elevation;

Figure 2 is a partial section on the line 2—2 of Figure 1, showing the automatic adjustment device, the brake and the upper valve being shown in brake applied position but the lower valve being shown in the position it assumes when the associated end of the shoe is anchored which also corresponds to brake released position;

Figure 3 is a section, at right angles to Figure 2, on the line 3—3 of Figure 1; and Figure 4 is a sectional view on an enlarged scale of one of the valves of Figure 2.

In the brake of Figures 1, 2, and 3, there is a rotatable drum 10, at the open side of which is a support such as a backing plate 12, and within which is arranged the brake friction means which in this case comprises a pair of floating and individually-shiftable shoes 314 and 316. Return springs 24 are tensioned between the shoes at their opposite ends.

The brake is applied by novel fluid-pressure means, which in this embodiment includes a pair of hydraulic wheel cylinders 326 secured to the backing plate adjacent each anchorage, and within each of which is arranged a relatively large-diameter piston 328 acting on the toe of one of the shoes (i. e., on the part of the shoe which leaves the anchorage during forward braking) and a relatively smaller-diameter piston 330 acting on the heel of the other shoe (i. e., on the part of the shoe which remains anchored on forward braking). The pistons may have suitable rubber packing cups 332.

By this arrangement, since the springs 24 pull equally on the two shoes, and since the larger-diameter pistons 328 thrust outwardly with more power than the smaller-diameter pistons 330, with any given fluid pressure in the line and in the cylinders 326 between the pistons, the pistons 330 do not operate to shift the heels of the shoes away from their anchors at any time during forward braking. Thus during forward braking, due to the differential action of the pistons and the equal action of the return springs, the shoes remain continuously anchored instead of leaving the anchors and then coming back with a shock under load.

During reverse braking, the action is the same until the shoes engage the drum, whereupon the shoes shift to the opposite anchors under the influence of drum friction, the liquid-filled cylinders serving in a manner analogous to door checks to slow up the shifting and minimize shock. When the brakes are first applied the plunger formed by the upper valve 310 moves forward and the liquid ahead of said plunger forces the plunger 328 outward. However, as the rotation of the drum acts upon the shoe 314, it forces the plunger 328 inward and the liquid trapped between the plunger 328 and the upper plunger 310 forces the plunger 310 outward to its closed position.

The shoes 14 and 16 may be held yieldingly in place by any suitable spring steady rests 48.

The shoes 314 and 316 are actuated by pistons 328 of large diameter and pistons 330 of smaller diameter, all arranged in novel wheel cylinder devices 326 connected by branches 100 from a union 102 fed by the hydraulic line 104. The pistons are provided with suitable rubber packing cups 332, and act with differential pressures, as previously described, against the equal tensions of the return springs 24.

The novel wheel cylinder device 326 contains coaxial cylinders for the two pistons 328 and 330, which cylinders are, however, separated by a solid wall 106 and provided with separate inlets 108. The inlets 108 are controlled by cone valves 310 having stems loosely but guidingly sliding in passages in plugs 312 threaded into the side of the wheel cylinder device and seated against valve springs 340 which are light enough to be easily overcome by springs 24. The passages containing the valves are in open communication with each other through openings 342, and are also in open communication with conduit 100. The upper valve 310 is shown intermediate its brake applied and brake released position while the lower valve is shown in its brake released position. It will be understood also that the valves occupy the position of the lower valve when the respective shoe end is anchored.

As may be seen more clearly in Figure 4, the passages in the plugs 312 are formed with two diameters providing a large diameter chamber 312a and a small diameter passage 312b. The conical head 310a of the valve 310 is positioned in the chamber 312a and the stem 310b is positioned in the passage 312b. The head 310a is the same diameter as the chamber 312a but the stem 310b is smaller than the passage 312b to provide an annular passage for the flow of fluid. However, the stem is large enough to be guided by the said passage. The transition between the large diameter chamber and the small diameter passage is formed by a conical valve seat 312c on which the conical head 310a seats in brake released or in anchored position. I prefer to make the head 310a somewhat cup-shaped and of pliable material such as rubber and it may be secured to the stem 310b by being seated in an annular groove formed in the end of the stem. The dimensions of the chamber 312a are predetermined so that the volumes of fluid contained therein are equal to the volumes which, when forced into the corresponding cylinder 328 or 330, will move the respective shoe sufficiently to take up the normal clearance and apply the brake fully.

In operation, brake-applying pressure on the line shifts the valves to the left in Figure 2 until they encounter the end of the chamber 312a and this forces the liquid ahead of the valves into the cylinders below the pistons, the pistons 328 moving first because of their greater area. This causes the brake to be applied in the normal case, the shoes anchoring through engagement of pistons 330 with the wall 106 or in the event that sufficient liquid has been trapped in the cylinder anchoring through the trapped liquid upon said wall 106.

If, however, the brake has worn so that it is not fully applied when the valves 310 reach their left-hand positions, additional liquid can flow past the valves, around their loosely-fitting stems and past their flexible heads which may be deformed adjacent the passage 108 by the pressure of the fluid, into the cylinders to cause full application of the brake. When the brake is now again released, valves 310 move to the right until they seat withdrawing from the cylinders an amount of liquid equal to the volume of the chamber 312a, whereupon the additional liquid so introduced is trapped in the cylinders and holds the shoes in automatically adjusted positions with predetermined clearance with respect to the drum, and the shoes anchor through the pistons on the trapped fluid. As explained above, the master cylinder at the pedal automatically forces more liquid into the system to replace that trapped in the wheel cylinders. The above-described adjustment introduces the additional liquid behind pistons 328 if it takes place during forward braking, and behind pistons 330 if it takes place during reverse braking.

It will be understood that the springs 340 serve to overcome the friction of movement of the valve 310 and thereby prevent any pressure differential arising from sudden application of the brakes from forcing fluid past the valve before it encounters the end of chamber 312a and thereby causing adjustment when it is unnecessary.

While an illustrative embodiment has been described in detail, it is not my intention to limit the scope of the invention to this particular embodiment, or otherwise than by the terms of the appended claims.

I claim:

1. A brake comprising a pair of shoes, two fluid pressure applying devices acting on said shoes, said shoes anchoring on said applying device in braking and means for trapping fluid in said devices through which the anchoring torque of the shoes is transmitted to said devices.

2. A brake comprising a pair of shoes, two fluid pressure applying devices acting on said shoes, each applying device being formed with a central partition, acting on said shoes and also serving as an anchor for the shoes.

3. Brakes comprising a pair of shoes, a pair of fluid pressure cylinders positioned between adjacent ends of said shoes, a piston in each of said cylinders for applying said shoes, projections on the inner ends of the pistons, and means formed as parts of said cylinders with which said projections contact to take the braking torque from the shoes through the pistons.

4. Brakes comprising a drum, a pair of shoes, a pair of fluid pressure devices each including a cylinder positioned between said shoes and serving to apply said shoes to the drum, elements interposed between the fluid pressure devices and the shoes for transmitting brake applying force, and means formed as parts of said cylinders comprising partitions with which said elements contact to take the braking torque from the shoes through the elements.

5. A brake comprising a pair of shoes, two fluid pressure applying devices acting on the shoes and also serving as anchors therefor, and automatically acting valves embodied in said devices and trapping therein quantities of fluid compensating for wear of the brake, said valves having springs urging them in the brake applying direction and said shoes having springs urging them in the brake releasing position and strong enough to overcome said valve springs.

6. A brake comprising a pair of shoes, two fluid pressure applying devices acting on the shoes, and automatically acting valves embodied in said devices and trapping therein quantities of fluid compensating for wear of the brake, said valves having springs urging them in the brake applying direction and said shoes having springs urging them in the brake releasing position and strong enough to overcome said valve springs.

7. A brake comprising a drum, a pair of shoes each arranged to anchor on one end in one direction of rotation of the drum and on the other end in the other direction of rotation of said drum, a pair of applying devices each positioned between adjacent ends of said shoes and each arranged to take the anchoring torque and each applying device comprising coaxial cylinders containing operating pistons and separated by a solid wall and having means to trap fluid between the pistons and said wall to position the pistons positively in their inner positions.

8. A cylinder member for a brake applying device comprising coaxial cylinders of different diameters separated by a solid wall, and having a valve controlled inlet to each of said cylinders, together with a common source of fluid pressure for the two inlets.

9. A brake comprising a pair of shoes, two fluid pressure applying devices acting on said shoes each formed with a central partition, and means for trapping fluid in said devices through which fluid the shoes may anchor on said partition in braking.

10. A brake comprising a pair of shoes, two fluid pressure applying devices each formed with a central partition, acting on said shoes and also serving as anchors therefor, and each positioned at an opposite side of the brake from the other, means for supplying fluid to said devices for applying the brakes, and means for trapping fluid in said devices through which fluid the shoes may anchor on said partition in braking.

11. A brake comprising a pair of shoes, two fluid pressure applying devices acting on said shoes and on which said shoes anchor in braking and which are positioned between said shoes at opposite sides of said brake, means for supplying fluid to said devices for applying said shoes, and means for trapping fluid in said devices through which fluid the shoes may anchor on said devices.

12. A brake comprising a pair of shoes each arranged to anchor at an opposite end depending upon the direction of rotation of the drum, two fluid pressure applying devices acting on the shoes and also serving as anchors therefor, each positioned at an opposite side of the drum from the other between adjacent ends of the two shoes, and automatically acting valves which are embodied in said devices and which are arranged to trap therein quantities of fluid through which trapped fluid the shoes may anchor on said devices during braking, the trapping of the fluid compensating for wear of the brake.

13. A brake comprising a pair of shoes, two fluid pressure applying devices acting on said shoes and forming anchors for said shoes, and automatically acting valves which are embodied in said devices, and which trap therein quantities of fluid to compensate for wear of the brakes, said valves comprising plungers which move a predetermined distance to discharge a measured amount of fluid into said devices and springs acting on the plungers in a direction tending to move them in the brake applying direction.

LUDGER E. LA BRIE.